(12) United States Patent
Yamaguchi et al.

(10) Patent No.: US 7,341,364 B2
(45) Date of Patent: Mar. 11, 2008

(54) TAIL LAMP STRUCTURE FOR VEHICLES

(75) Inventors: Seiji Yamaguchi, Saitama (JP);
Yoshihiro Takanashi, Saitama (JP);
Kenta Nakamura, Saitama (JP);
Masaru Nakayama, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 183 days.

(21) Appl. No.: 11/247,264

(22) Filed: Oct. 12, 2005

(65) Prior Publication Data
US 2006/0077677 A1    Apr. 13, 2006

(30) Foreign Application Priority Data
Oct. 12, 2004   (JP)   ............................. 2004-297933

(51) Int. Cl.
*B62J 6/04* (2006.01)
(52) U.S. Cl. .................. 362/473; 362/506; 362/545
(58) Field of Classification Search ............... 362/237, 362/240, 244, 251, 473, 474, 475, 476, 497, 362/498, 499, 506, 507, 541, 544, 545
See application file for complete search history.

(56) References Cited

U.S. PATENT DOCUMENTS 4,949,228 A * 8/1990 Lin et al. .................... 362/473
7,108,407 B2 * 9/2006 Kashiwagi .................. 362/506

FOREIGN PATENT DOCUMENTS

JP         02164630 A  *  6/1990
JP      2002-337775 A    11/2002

* cited by examiner

*Primary Examiner*—Y. My Quach-Lee
(74) *Attorney, Agent, or Firm*—Birch, Stewart, Kolasch & Birch, LLP

(57) ABSTRACT

In a vehicle that includes a rear fender for covering the upper portion of a rear wheel, a mud guard cover for covering the rear portion of the rear wheel, and a tail lamp arranged around the rear fender and the mud guard cover wherein the tail lamp includes light-emitting diodes as light sources, and includes a light-emitting diode board for placing the light-emitting diodes thereon, a control element board for placing a control element for controlling the light-emitting diodes thereon, a housing for collectively accommodating the light-emitting diode board and the control element board, and a lens for covering the housing and the control element board that is arranged downwardly of the light-emitting diode board.

19 Claims, 10 Drawing Sheets

TAIL LAMP STRUCTURE FOR VEHICLES

CROSS-REFERENCE TO RELATED APPLICATIONS

The present application claims priority under 35 USC 119 to Japanese Patent Application No. 2004-297933 filed on Oct. 12, 2004 the entire contents of which are hereby incorporated by reference.

1. Field of the Invention

The present invention relates to a tail lamp structure for a vehicle.

2. Description of Background Art

A tail lamp structure for a vehicle is known wherein a light-emitting diode is used as a light source for improving visibility.

In a tail lamp structure for a vehicle in which the light-emitting diodes are arranged on a board, the board and the light-emitting diodes are arranged in a housing, and a lens is used for covering the housing.

A tail lamp structure for a vehicle as described above, is disclosed in JP-A-2002-337775, see page 8, FIG. 6.

The tail lamp structure for a vehicle is significantly related to the design of its appearance. In addition, it is necessary to have high flexibility in the design. Thus, it is required to devise an structure for a light-emitting diode board (sub-board) for mounting the light emitting diodes (LED) thereon, a control element board (main board) for mounting a control element for controlling the light-emitting diode, a housing for storing the light-emitting diode board and the control element board, a lens for covering the housing, a harness (wiring member) extending from the control element board and extending outwardly from the housing, and a connector attached to the distal end of the harness.

More specifically, in the case of a tail lamp structure using the light-emitting diode, the dimension in the vertical direction can be reduced easily, but the dimension thereof in the fore-and-aft direction of a vehicle body is apt to be increased. Therefore, it has been required to contrive ways for miniaturization.

In addition, in the tail lamp structure in the related art, since upper portions of the housing and the lens are covered by a tail cover, a different member (tail cover) is required for covering the tail lamp of the vehicle in the mounted state, which results in an increase in the number of parts. Therefore, further upsizing of the structure has been a problem to be solved.

SUMMARY AND OBJECTS OF THE INVENTION

It is an object of the present invention to solve the above-described problems and to provide a tail lamp structure for a vehicle which can correspond with the design for flexibility in the appearance, and can be reduced in depth. In addition, the problem relating to an increase in the number of components is solved to permit further miniaturization.

In an embodiment of the present invention, a vehicle includes a rear fender covering the upper portion of a rear wheel with a mud guard cover covering over the rear portion of the rear wheel. A tail lamp is arranged around the rear fender and the mud guard cover. The tail lamp includes a light-emitting diode as a light source and includes a light-emitting diode board for placing the light-emitting diode thereon, a control element board for placing a control element for controlling the light-emitting diode thereon, a housing for collectively accommodating the light-emitting diode board and the control element board, and a lens for covering the housing. In addition, the control element board is arranged either upwardly or downwardly of the light-emitting diode board.

For example, it is preferable for the depth of the tail lamp of the vehicle can be reduced. Thus, the entire length of the vehicle can be reduced and a space with respect to the rear wheel can be sufficiently secured.

Accordingly, the light-emitting diode is placed on the light-emitting diode board, and the control element for controlling the light-emitting diode is placed on the control element board. Further, the light-emitting diode board and the control element board are accommodated in the housing with the housing being covered by the lens. Thus, the control element board is disposed upwardly or downwardly of the light-emitting diode board.

In other words, by arranging the control element board upwardly or downwardly of the light-emitting diode board, the depth of the tail lamp can be reduced.

In an embodiment of the present invention, the control element board is hidden from view by arranging the control element board downwardly of the light-emitting diode board, and covering the control element board with the mud guard cover.

By arranging the control element board downwardly of the light-emitting diode board and covering the control element board with the mud guard cover, so that the control element board is hidden from view when viewed from the outside the control element board is hidden from the outside and protected from the outside.

In an embodiment of the present invention, a harness is connected to the control element board or the light-emitting diode board, and the harness is extended outwardly from a side of the housing.

By connecting the harness with the control element board or the light-emitting diode board and extending the harness outwardly from the side of the housing, the depth of the tail lamp can be reduced, for example, in comparison with a case in which the harness extends rearwardly.

In an embodiment of the present invention, the rear fender extends above the lens rearwardly with respect to the upper portion of the lens.

By extending the rear fender rearward over the lens with respect to the upper portion of the lens, light from the outside coming into the tail lamp is blocked.

In an embodiment of the present invention, the mud guard cover is formed with an enlarged portion, and the control element board is hidden from view when viewed from the rear by the enlarged portion.

By providing the enlarged portion on the mud guard cover, and covering the control element board with the enlarged portion, the tail lamp of the vehicle is arranged at a position shifted rearwardly.

In an embodiment of the present invention, the enlarged portion is provided with a license lamp or a number plate mounting portion.

By providing the license lamp or the number plate mounting portion on the enlarged portion, the flexibility in the design can be increased.

In an embodiment of the present invention, an inner lens is provided between the light-emitting diode and the lens, and the control element board is provided rearwardly of the inner lens with respect to a vehicle body.

By providing the inner lens between the light-emitting diode and the lens and providing the control element board rearwardly of the inner lens with respect to the vehicle body, the depth of the tail lamp can further be reduced.

In an embodiment of the present invention, a light-shielding panel is provided between the inner lens and the control element board.

By providing the light-shielding panel between the inner lens and the control element board, light leaked on the side of the control element board can be blocked, and the design can be improved.

In an embodiment of the present invention, the light-shielding panel is provided integrally with the inner lens.

By providing the light-shielding panel integrally with the inner lens, the assembleability can be improved.

In an embodiment of the present invention, a rear fender for covering over the upper portion of a rear wheel is provided together with a mud guard cover for covering over the rear portion of the rear wheel, and a tail lamp arranged around the rear fender and the mud guard cover. The tail lamp includes a light-emitting diode as a light source and includes a light-emitting diode board for placing the light-emitting diode thereon, a control element board for placing a control element for controlling the light-emitting diode thereon, a housing for collectively accommodating the light-emitting diode board and the control element board, and a lens for covering the housing. The control element board is arranged forwardly of the light-emitting diode board.

By composing the tail lamp of the light-emitting diode board for placing the light-emitting diode thereon, the control element board for placing the control element for controlling the light-emitting diode thereon, the housing for collectively accommodating the light-emitting diode board and the control element board, and the lens for covering the housing, and arranging the control element board rearwardly of the light-emitting diode board with respect to the vehicle body, the depth of the tail lamp can be reduced.

In an embodiment of the present invention, the tail lamp includes the light-emitting diode board for placing the light-emitting diode thereon, the control element board for placing the control element for controlling the light-emitting diode thereon, the housing for collectively accommodating the light-emitting diode board and the control element board, and the lens for covering the housing. The control element board is arranged upwardly or downwardly of the light-emitting diode board. Thus, the depth of the tail lamp can be set to a reduced value. Consequently, the entire length of the vehicle can advantageously be reduced. Alternatively, a sufficient space is advantageously secured with respect to the rear wheel.

In an embodiment of the present invention, since the control element board is disposed downwardly of the light-emitting diode board, and the control element board is covered by the mud guard cover, so that the control element board is hidden from view when viewed from the outside, the control element board can be hidden from the outside and can be protected from the outside.

For example, in comparison with the case in which the control element board is covered using an additional part, the number of components can advantageously be reduced. Also, an existing part can be used conveniently, and the application of the existing part can advantageously be increased.

In an embodiment of the present invention, since the harness is connected to the control element board and the harness extends from the side of the housing toward the outside, for example, in comparison with the case in which the harness extends rearwardly, the depth of the tail lamp can be reduced. Consequently, a sufficient space is advantageously secured with respect to the rear wheel.

In an embodiment of the present invention, since the rear fender extends above the lens rearwardly with respect to the upper portion of the lens, light from the outside coming into the tail lamp is blocked. Consequently, the tail lamp for a vehicle that has good visibility can advantageously be realized.

In an embodiment of the present invention, since the mud guard cover is formed with an enlarged portion, and the control element board is hidden from view when viewed from the rear by the enlarged portion, the tail lamp of the vehicle can be arranged at a position that is shifted rearwardly. Consequently, a sufficient space is advantageously secured with respect to the rear wheel.

In an embodiment of the present invention, since the enlarged portion is provided with the license lamp or the number plate mounting portion, the flexibility in the design is advantageously increased.

In an embodiment of the present invention, since the inner lens is provided between the light-emitting diode and the lens, and the control element board is provided rearwardly of the inner lens with respect to the vehicle body, a further reduction in the depth of the tail lamp is advantageously achieved.

In an embodiment of the present invention, since the light-shielding panel is provided between the inner lens and the control element board, light that may leak on the side of the control element board can advantageously be blocked. Thus, the design can be improved.

In an embodiment of the present invention, since the light-shielding panel is provided integrally with the inner lens, the assembleability can be improved.

In an embodiment of the present invention, the tail lamp includes the light-emitting diode board for placing the light-emitting diode thereon, the control element board for placing the control element for controlling the light-emitting diode thereon, the housing for collectively accommodating the light-emitting diode board and the control element board, and the lens for covering the housing. The control element board is arranged rearwardly of the light-emitting diode board with respect to the vehicle body. Thus, the depth of the tail lamp can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
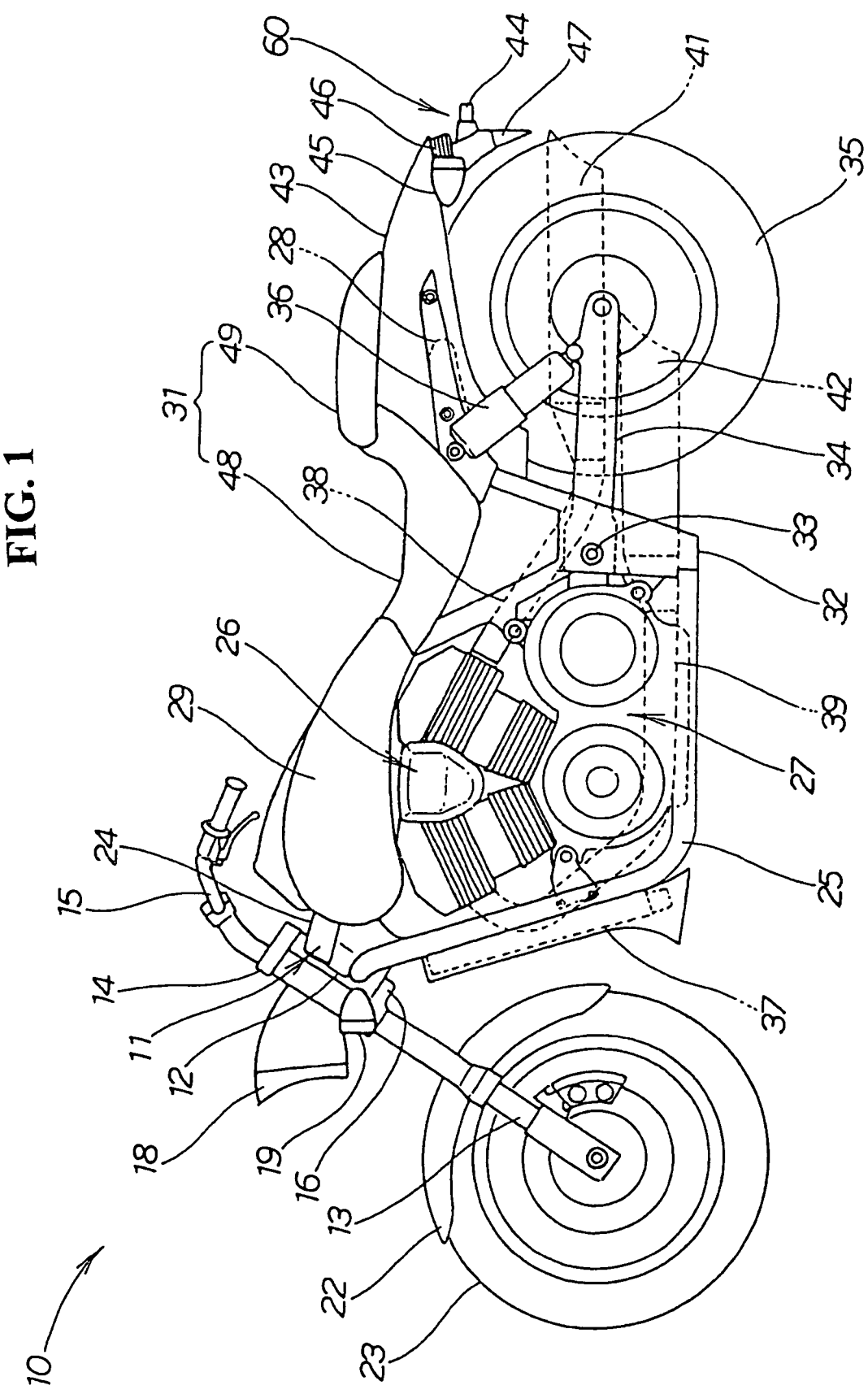
FIG. 1 is a side view of a vehicle in which a tail lamp structure according to the present invention is employed.

FIG. 1 is a side view of a vehicle in which a tail lamp structure according to the present invention is employed. A motorcycle 10 is configured by mounting a head pipe 12 to a vehicle body frame 11 with a front fork 13 steerably mounted on the head pipe 12. A steering handle 15 is provided on a top bridge 14 of the front fork 13. A head light 18 and left and right front winkers 19 (numeral 19 on the right side is not shown) are provided at a front portion between the top bridge 14 and a bottom bridge 16. A front fender 22 is provided together with a front wheel 23 mounted at a lower portion of the front fork 13. A main frame 24 of the vehicle body frame 11 extends rearwardly from the head pipe 12. A down tube 25 of the vehicle body frame 11 extends rearwardly from obliquely below. An engine 26 is mounted between the main frame 24 and the down tube 25. A transmission 27 is connected to the engine 26 with a fuel tank 29 positioned on the main frame 24. A seat rail 28 extends rearwardly from the main frame 24 for mounting a seat 31 to the seat rail 28. A sub frame 32 extends from the down tube 25 to the seat rail 28 with a rear swing arm 34 extending from a lower rear portion of the vehicle body frame 11 via a pivot 33. A rear wheel 35 is rotatably mounted at a rear end of the rear swing arm 34. A shock absorber 36 extends between the rear portion of the rear swing arm 34 and the vehicle body frame 11. Exhaust pipes 38, 39 extend from the engine 26.

In the drawing, a radiator 37 is provided together with mufflers 41, 42 connected respectively to the exhaust pipes 38, 39, a rear fender 43, a license lamp 44, a rear winker 45, a tail lamp 46, and a mud guard cover 47 (mud guard).

The seat 31 includes a driver's seat 48 on which a driver is seated, and a passenger's seat 49 formed one step higher than the driver's seat 48 on which a passenger is seated.

A tail lamp structure 60 is provided for a vehicle according to the present invention (hereinafter, abbreviated as "tail lamp structure 60"). A detailed description is set forth below.

Figure 2:
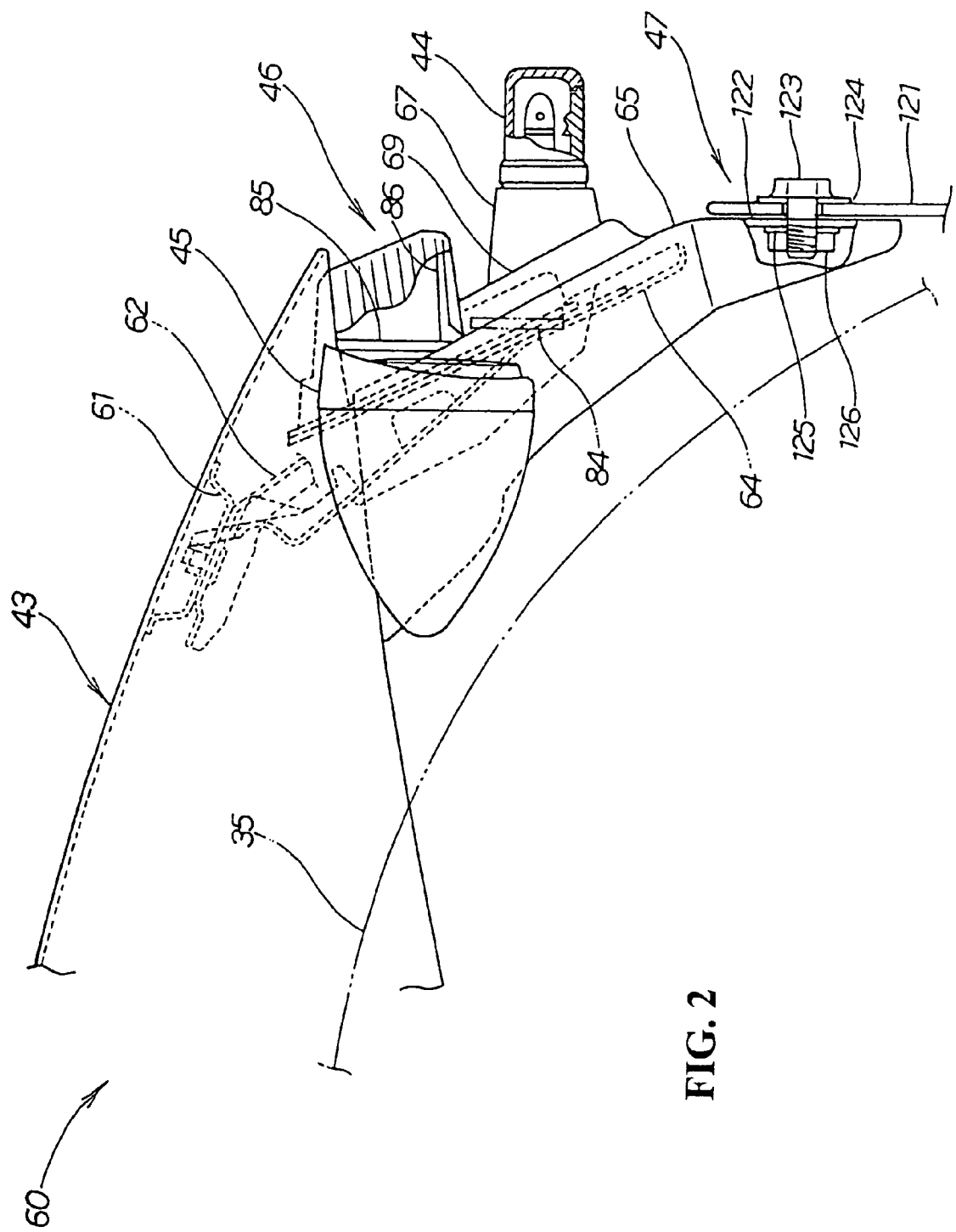
FIG. 2 is a side view of the tail lamp structure for a vehicle according to the present invention.

FIG. 2 is a side view of the tail lamp structure for a vehicle according to the present invention. The tail lamp structure 60 is configured by mounting a supporting stay 61 to the rear fender 43, mounting a tail lamp bracket 62 to the supporting stay 61, mounting the tail lamp 46 to the tail lamp bracket 62, covering a rear surface of the tail lamp 46 by an inner fender 64, causing the tail lamp bracket 62 and the rear fender 43 to support the mud guard cover 47, mounting the license lamp 44 on a surface of the mud guard cover 47, and causing the mud guard cover 47 to support the left and right rear winkers 45, 45 (numeral 45 on the further side is not shown) on the left and right sides.

In other words, as illustrated in FIGS. 1 and 2 the tail lamp structure 60 is mounted to the rear fender 43 covering over the upper portion of the rear wheel 35 with the mud guard cover 47 covering over the rear portion of the rear wheel 35, and the tail lamp 46 arranged around the rear fender 43 and the mud guard cover 47. An external structure is provided in which light from the outside coming into the tail lamp 46 is blocked by covering the upper portion of the tail map 46 with the rear fender 43. The external structure is provided in which an interior of the tail lamp 46 is hidden by masking the lower portion of the tail lamp 46 by the mud guard cover 47. In addition, an external structure is provided in which multifunction of the mud guard cover 47 is achieved by mounting the license lamp 44 and the left and right rear winkers 45, 45 to the mud guard cover 47. As described later, the table lamp structure 60 includes an internal structure of the tail lamp 46.

In the drawing, a number plate 121 is provided together with a number plate mounting portion 122, a bolt 123, a washer 124, a spring washer 125, and a nut 126.

Figure 3:
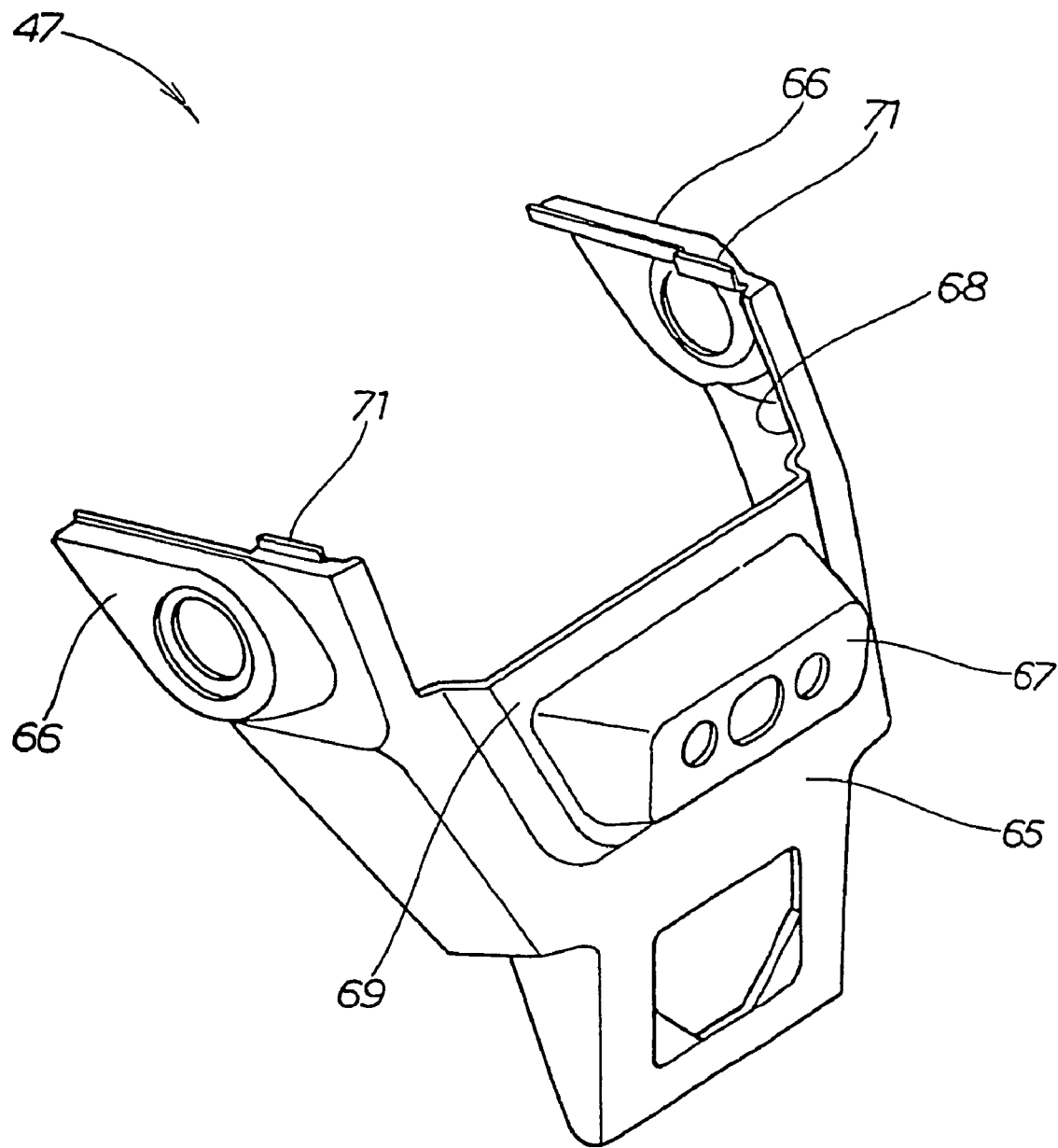
FIG. 3 is a perspective view of a mud guard cover of the tail lamp structure for a vehicle according to the present invention.

FIG. 3 is a perspective view of the mud guard cover of the tail lamp structure for a vehicle according to the present invention. The mud guard cover 47 includes a main body portion 65 with left and right winker supporting portions 66, 66 for supporting the left and right rear winkers 45, 45 (see FIG. 2) respectively. A projection 67 is provided for mounting the license lamp 44 (see FIG. 2) with an opening 68 for exposing the tail lamp 46. An enlarged portion 69 is provided for covering part of the tail lamp 46 with inserting portions 71, 71 that are inserted into the rear fender 43.

By providing the projection 67 for mounting the license lamp 44 on the mud guard cover 47, or by providing the left and right winker supporting portions 66, 66 for supporting the left and right rear winkers 45, 45 (see FIG. 2) respectively, the multifunction of the mud guard cover 47 is achieved. Consequently, the cost of the motorcycle 10 (see FIG. 1) can be reduced.

Figure 4:
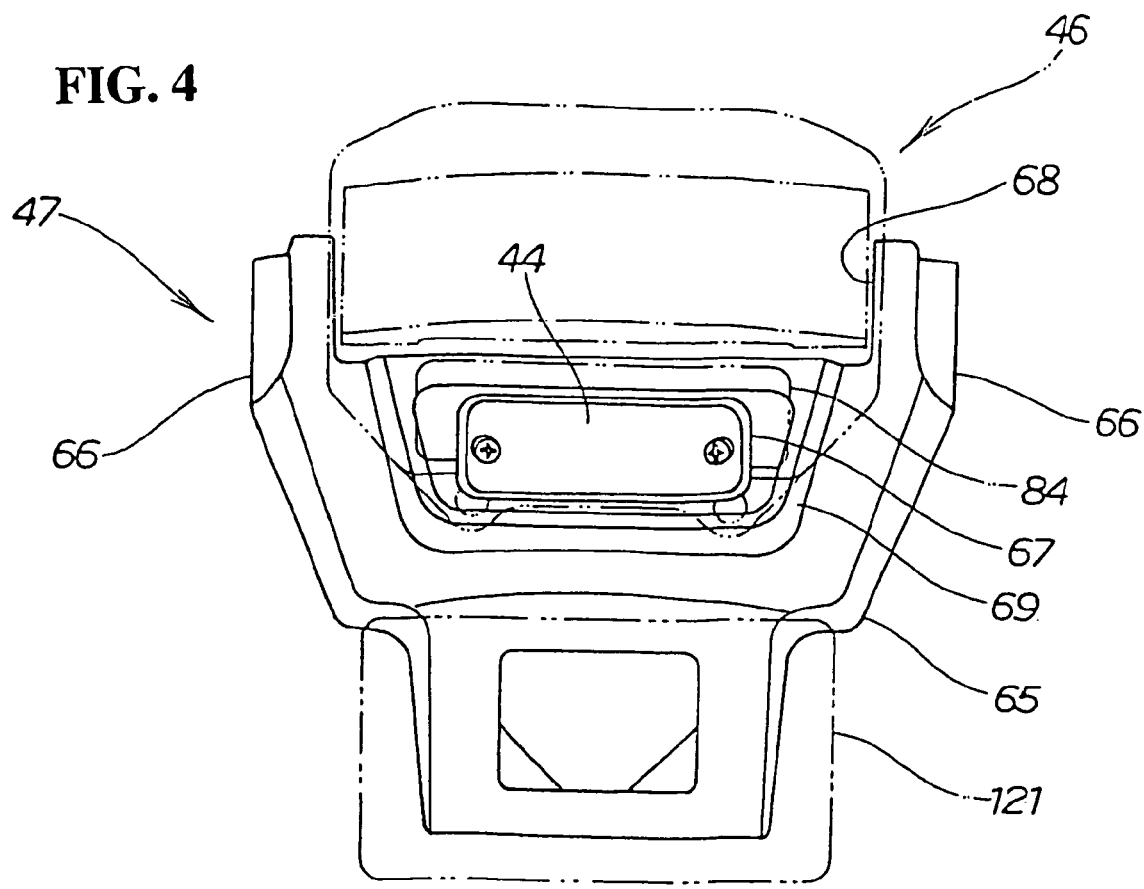
FIG. 4 is a front view of the mud guard cover of the tail lamp structure for a vehicle according to the present invention.

FIG. 4 is a front view of the mud guard cover of the tail lamp structure for a vehicle according to the present invention, wherein the lower portion of the tail lamp is covered by the enlarged portion 69 of the mud guard cover 47.

The lower portion of the tail lamp 46, as described later, includes a control element board 84 arranged thereon and, by covering the lower portion of the tail lamp 46 with the enlarged portion 69 of the mud guard cover 47, a reduction of the number of components is achieved, for example, in comparison with the case in which the control element board 84 is masked by an additional part. Also, the existing mud guard cover 47 can be used conveniently. Thus, the application of the mud guard cover 47 can be increased.

Figure 5:
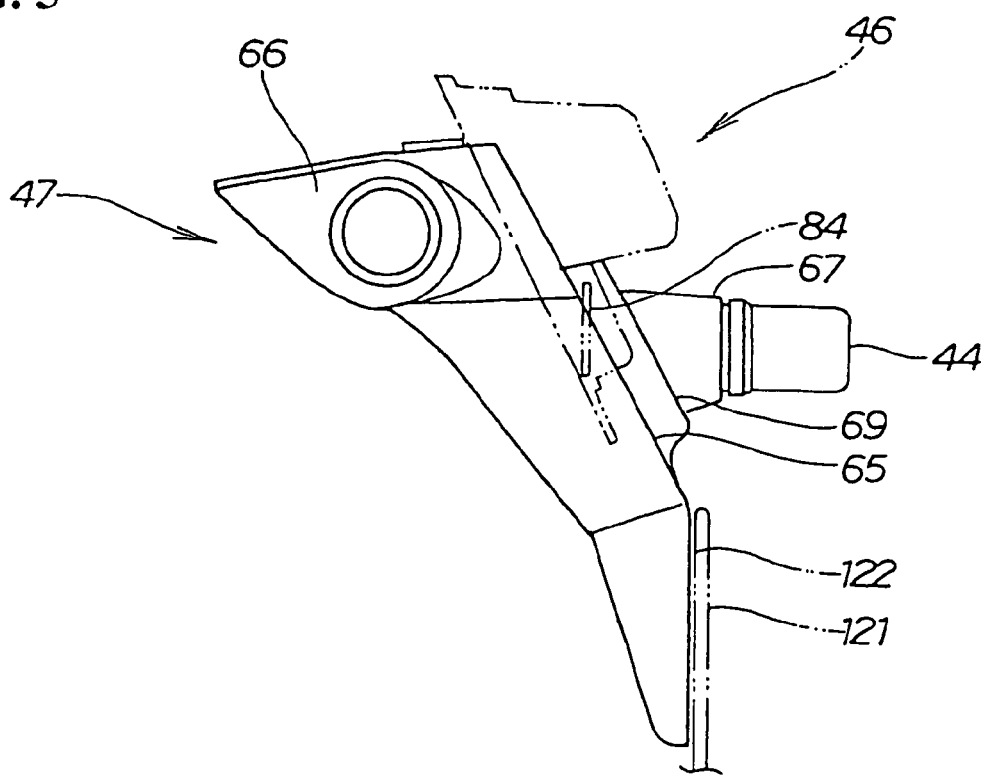
FIG. 5 is a side view of the mud guard cover of the tail lamp structure for a vehicle according to the present invention.

FIG. 5 is a side view of the mud guard cover of the tail lamp structure for a vehicle according to the present invention, illustrating that the tail lamp can be mounted so as to overhang outwardly (rearwardly of the vehicle body) by forming the enlarged portion 69 on the mud guard cover 47.

In other words, since the enlarged portion 69 is provided on the mud guard cover 47 and the control element board 84 is masked by the enlarged portion 69, the tail lamp 46 can be arranged so as to shift rearwardly. Consequently, a sufficient space can be secured with respect to the rear wheel (see FIG. 2) 35.

By providing, for example, the license lamp 44 or the number plate mounting portion on the enlarged portion 69, the flexibility of the design can be increased.

Figure 6:
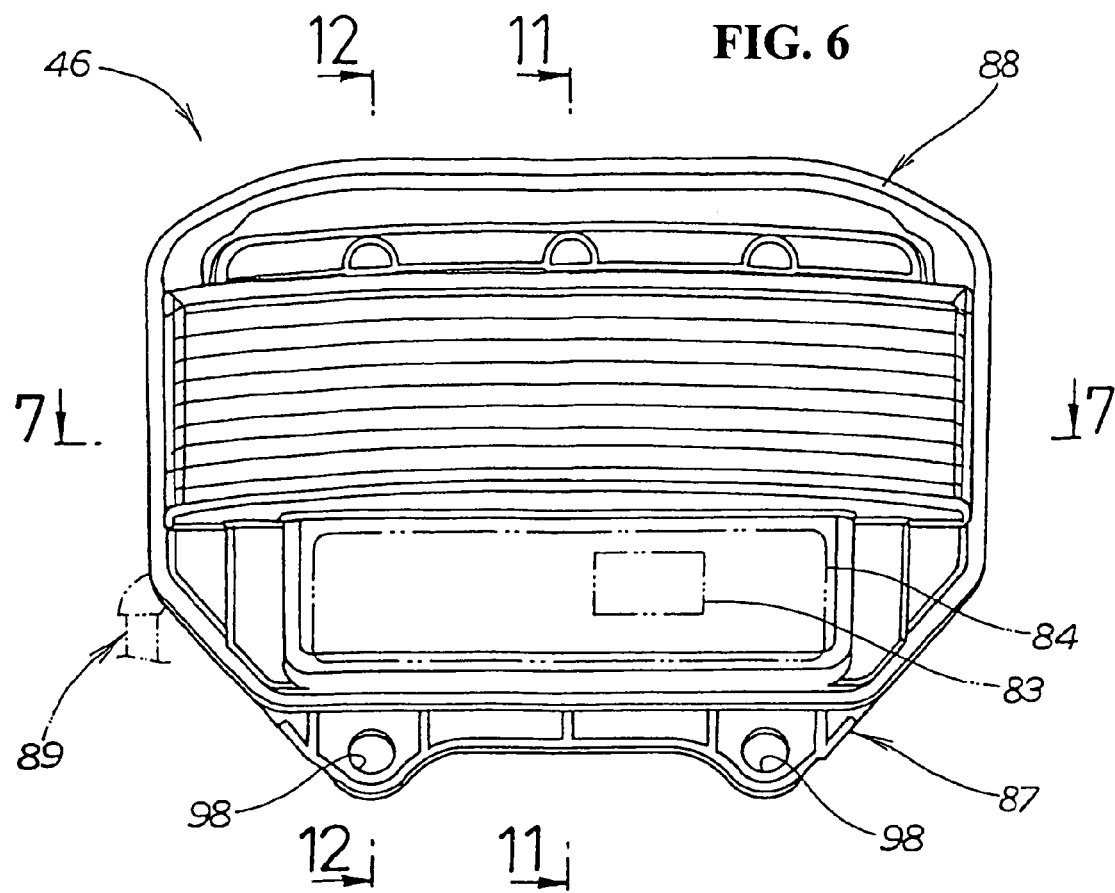
FIG. 6 is a front view of a tail lamp of the tail lamp structure for a vehicle according to the present invention.
Figure 7:
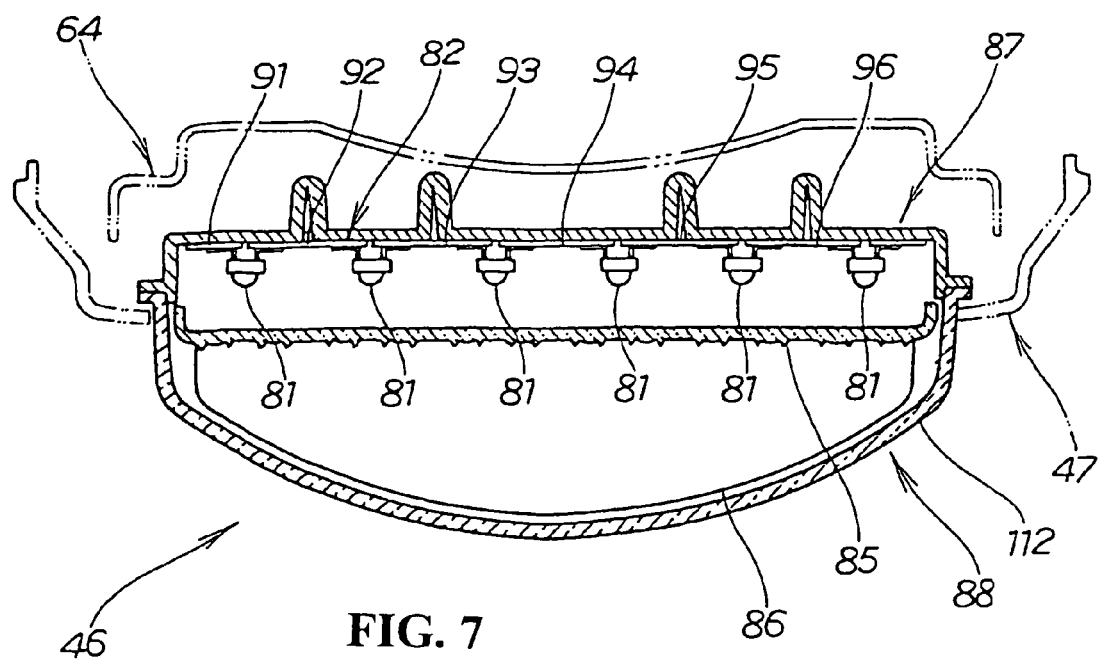
FIG. 7 is a cross-sectional view taken along a line 7-7 in FIG. 6.

FIG. 6 is a front view of the tail lamp of the tail lamp structure for a vehicle according to the present invention, and FIG. 7 is a cross-sectional view taken along a line 7-7 in FIG. 6.

The tail lamp 46 is a tail lamp employing a plurality of light-emitting diodes (LED) 81 . . . ( . . . represents that there are a plurality of components, hereinafter) as the light sources. A light-emitting diode board 82 shown in FIG. 7 is provided for mounting the light-emitting diodes 81 . . . . The control element board 84 is provided for mounting a control element 83 for controlling the light-emitting diodes 81 . . . . An inner lens (diffuser panel) 85 shown in FIG. 7 is provided for causing light from the light-emitting diodes 81 . . . to diffuse. A light-shielding panel 86 is disposed so as to be orthogonal to the inner lens 85 for blocking light from the light-emitting diodes 81 . . . . A housing 87 is provided for collectively storing the light-emitting diode board 82, the control element board 84, the inner lens 85, and the light-shielding panel 86 with a lens 88 for covering the housing 87. A harness (wiring member) 89 extends from the housing 87.

The control element 83 is a generic designation that includes passive elements such as a resistance and capacitor, and positive elements such as a transistor, FET, IC.

Figure 8:
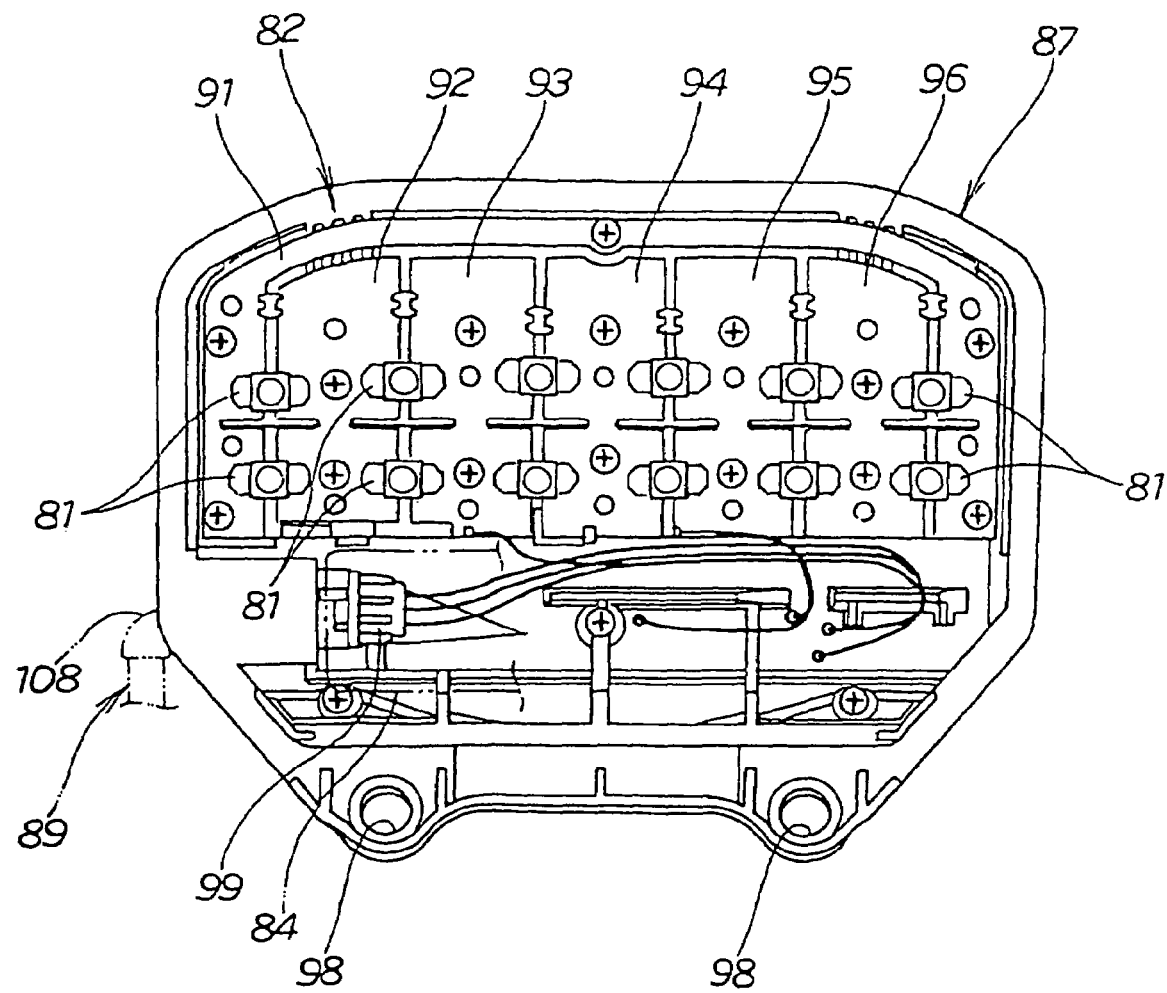
FIG. 8 is a front view showing a light-emitting diode board and a housing of the tail lamp structure for a vehicle according to the present invention.

FIG. 8 is a front view showing the light-emitting diode board and the housing of the tail lamp structure for a vehicle according to the present invention, and illustrates that the light-emitting diode board 82 includes a plurality of terminal plates (metal plates) 91-96 arranged in and fixed to the housing 87 with two light-emitting diodes 81, 81 being connected between the terminal plate 91 and the terminal plate 92, and two light-emitting diodes 81, 81 being connected between the terminal plate 92 and a terminal plate 93, and two light-emitting diodes 81, 81 being connected between the terminal plate 93 and the terminal plate 94, and two light-emitting diodes 81, 81 being connected between the terminal plate 94 and the terminal plate 95 and two light-emitting diodes 81, 81 being connected between the terminal plate 95 and a terminal plate 96, and two light-emitting diodes 81, 81 being connected between the terminal plate 96 and the terminal plate 91.

The housing 87 includes fixing holes 98, 98 for fixing the inner fender 64. The control element board 84 is provided with an internal wiring member 99 to be connected with the harness 89.

Figure 9:
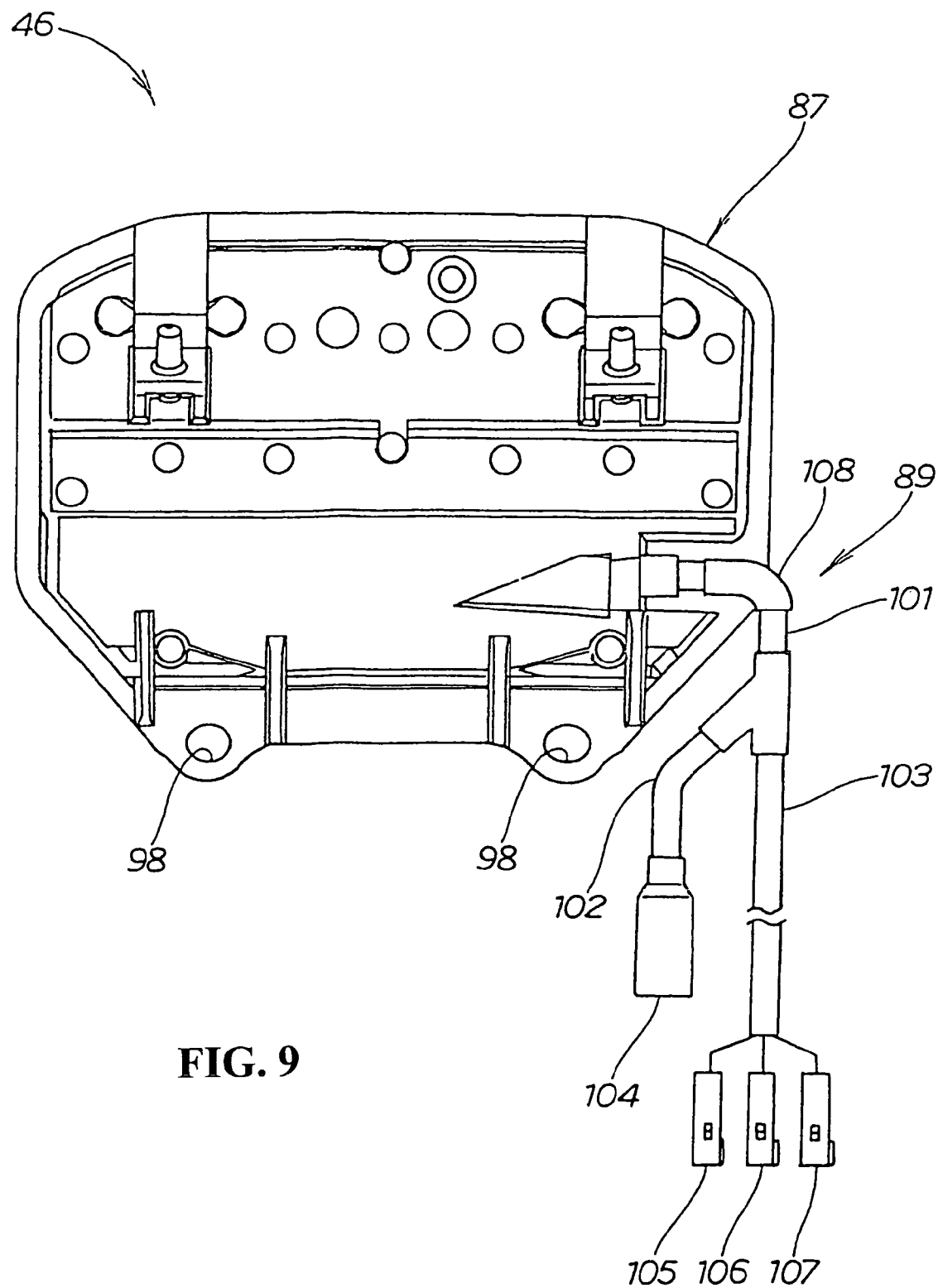
FIG. 9 is a back view of the tail lamp of the tail lamp structure for a vehicle according to the present invention.

FIG. 9 is a back view of the tail lamp of the tail lamp structure for a vehicle according to the present invention, in which the harness 89 extends outwardly from the side of the housing 87, and is branched into a power source supply harness 102 and a signal harness 103 from a midpoint of an extended harness 101. The power source supply harness 102 is provided with a coupler 104 at a distal end, and first to third connectors 105-107 at a distal end of the signal harness 103. In FIG. 9, a harness draw-out member 108 is provided.

In other words, the tail lamp structure 60 (tail lamp 46) shown in FIG. 2 is referable to be a structure in which the harness 89 is connected to the control element board 84 (see FIG. 6), and the harness 89 extends outwardly from the side of the housing 87.

By connecting the harness 89 to the control element board 84, and causing the harness 89 to extend outwardly from the side of the housing 87, the depth of the tail lamp 46 can be reduced, for example, in comparison with the case in which the harness extends rearwardly. Consequently, a sufficient space can be secured with respect to the rear wheel 35 (see FIG. 2).

The harness draw-out member 108 is inclined along the inner fender 64, and is arranged forwardly of the light-emitting diode board 82 and rearwardly of the control element board 84.

Figure 10:
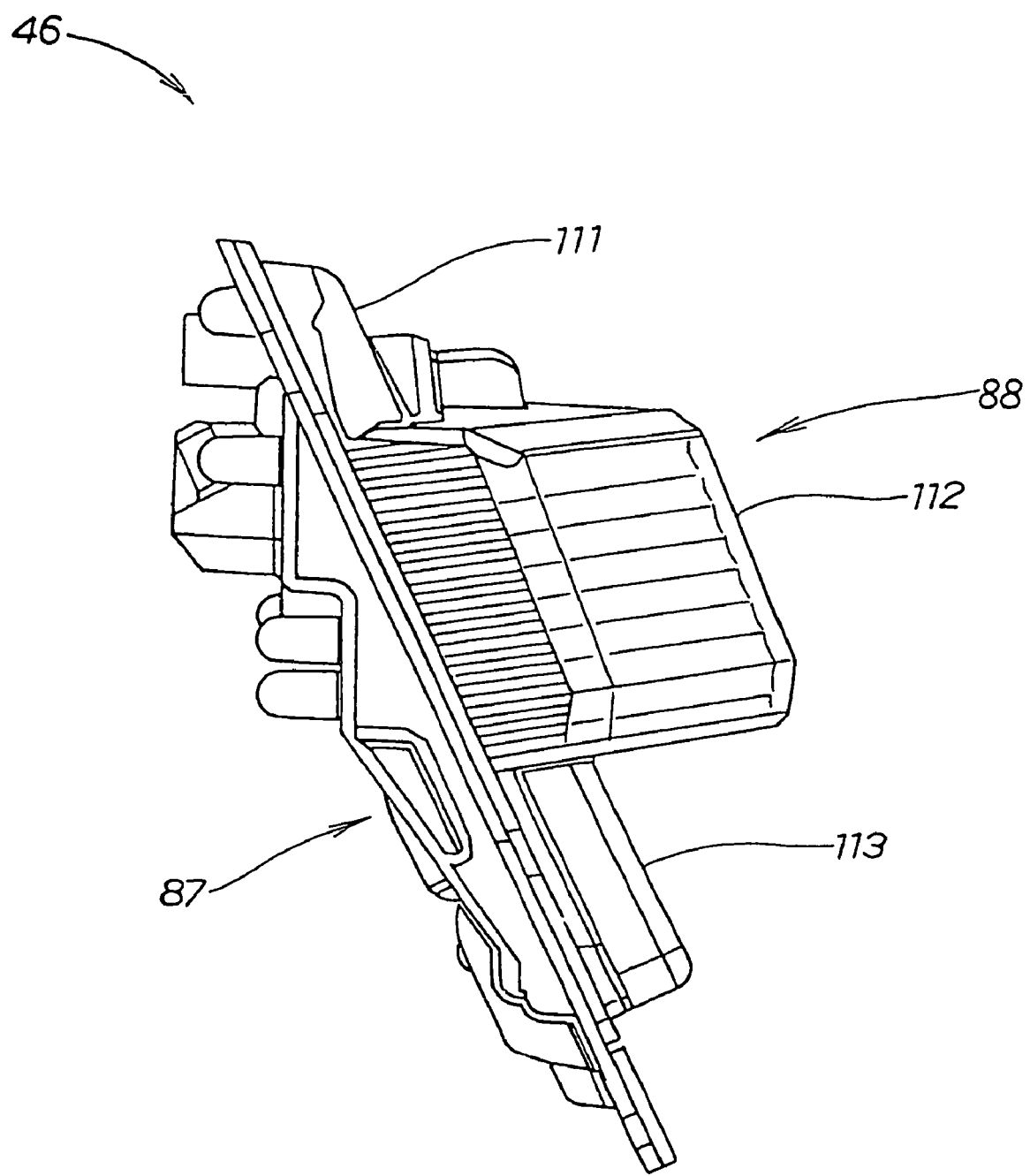
FIG. 10 is a side view of the tail lamp of the tail lamp structure for a vehicle according to the present invention.

FIG. 10 is a side view of the tail lamp of the tail lamp structure for a vehicle according to the present invention, in which the lens 88 is a member formed of a transparent resin, and includes an upper cover portion 111 for covering the upper portion of the light-emitting diode board 82 (see FIG. 2), a lens body portion 112 for allowing light from the light-emitting diodes 81 . . . to be transmitted through the inner lens (diffuser panel) 85, and a lower cover portion 113 for covering the control element board.

Therefore, as shown in FIG. 2, the tail lamp structure 60 is configured to cause the lens body portion 112 to project outwardly by covering the upper cover portion 111 by the rear fender 43, and covering the lower cover portion 112 by the mud guard cover 47.

Figure 11:
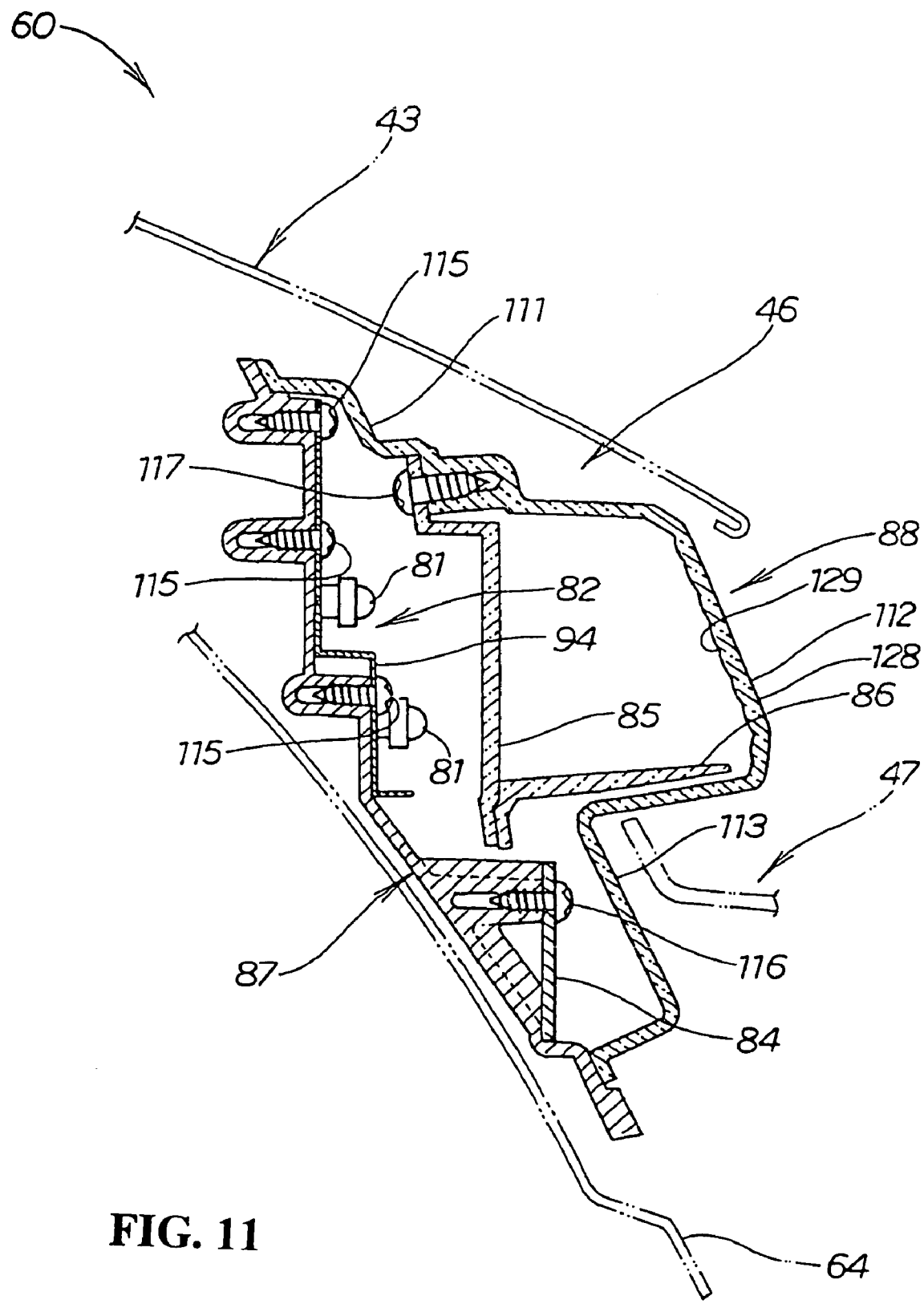
FIG. 11 is a cross-sectional view taken along a line 11-11 in FIG. 6.

FIG. 11 is a cross-sectional view taken along a line 11-11 in FIG. 6, showing a side cross-section of the tail lamp structure 60. In the motorcycle (vehicle) 10 shown in FIG. 1 that includes the rear fender 43 covering over the upper portion of the rear wheel 35 (see FIG. 2), the mud guard cover 47 covers over the rear portion of the rear wheel 35. The tail lamp structure 60 is referable to be such that the tail lamp 46 is arranged around the rear fender 43 and the mud guard cover 47 with the tail lamp 46 being a tail lamp having light-emitting diodes 81 . . . as the light sources. The tail lamp is preferred to be composed of the light-emitting diode board 82 for placing the light-emitting diodes 81 . . . thereon with the control element board 84 for placing the control element 83 (see FIG. 6) for controlling the light-emitting diodes 81 . . . thereon, the housing 87 for collectively accommodating the light-emitting diode board 82 and the control element board 84, and the lens 88 for covering the housing 87. The control element board 84 is arranged downwardly of the light-emitting diode board 82.

For example, it is preferable if the depth of the tail lamp of the vehicle can be reduced, because the entire length of the vehicle can be reduced, and a space with respect to the rear wheel can be sufficiently secured.

In other words, by arranging the control element board 84 downwardly of the light-emitting diode board 82, the depth of the tail lamp 46 is set to be thin. Consequently, the entire length of the motorcycle 10 (see FIG. 1) can be reduced. Alternatively, a sufficient space with respect to the rear wheel 35 can be secured.

In the drawing, mounting screws 155 . . . are provided for mounting the light-emitting diode board 82 to the housing 87 together with a mounting screw 116 for mounting the control element board 84 to the housing 87, and a mounting screw 117 for mounting the inner lens (diffuser panel) 85 to the lens 88.

In the drawing, an outer lens portion 128 is provided together with an inner lens portion 129. The lens body portion 112 is formed to have a two-layer structure. By disposing the clear outer lens portion 128 on the outer side and the inner lens portion 129 having a fine cut on the inner side, a clear tail lamp 46 providing a depth feeling can be realized. In addition, since the light-emitting diodes (LED) 81 . . . cannot be seen from the outside, the difference between ON and OFF can easily be recognized.

Also, by arranging the control element board 84 rearwardly of the light-emitting diode board 82 with respect to the vehicle body, the depth of the tail lamp 46 can be reduced. Also, the maintenanceability of the tail lamp 46 can be improved.

Figure 12:
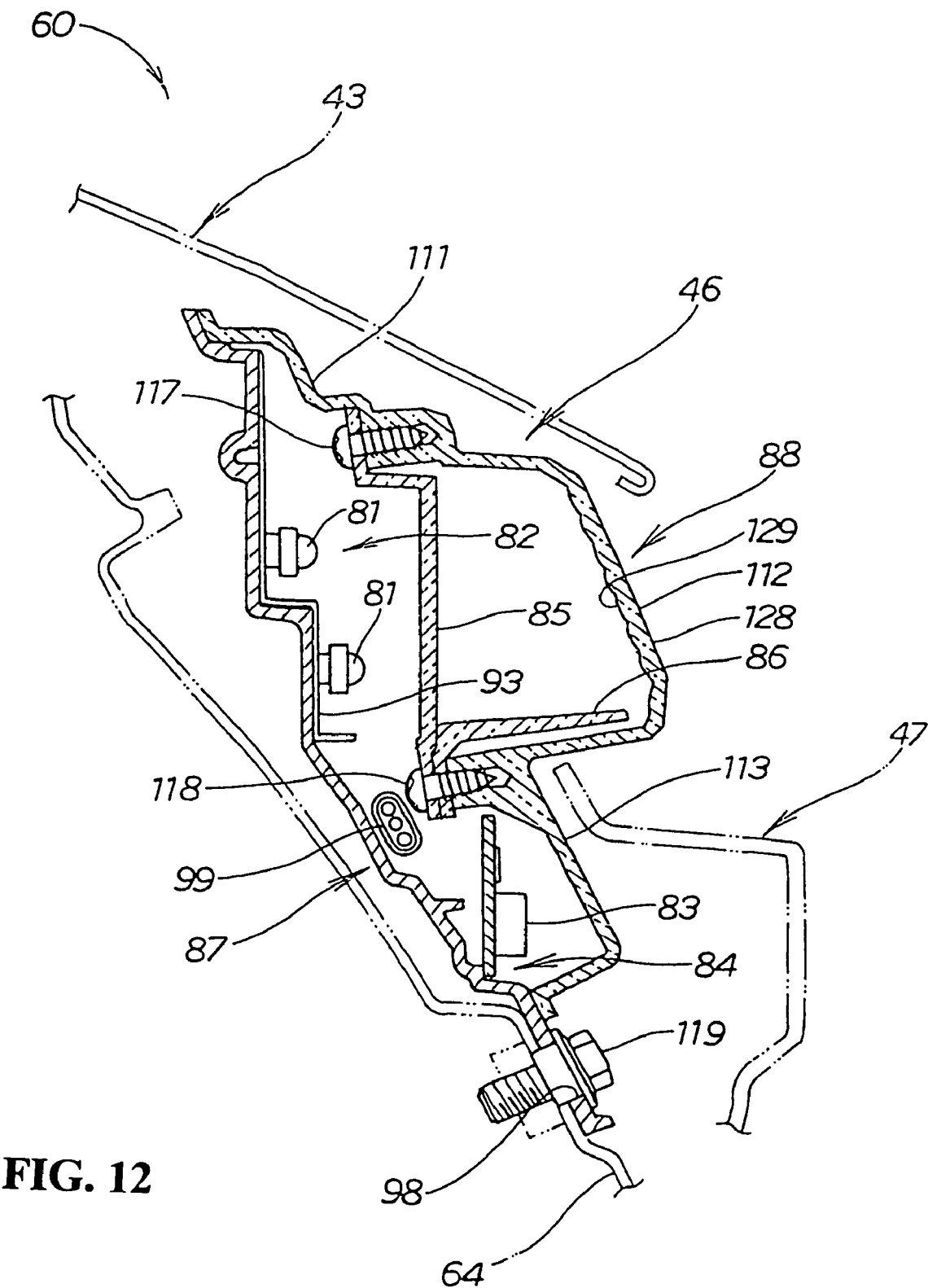
FIG. 12 is a cross-sectional view taken along a line 12-12 in FIG. 6.

FIG. 12 is a cross-sectional view taken along a line 12-12 in FIG. 6, and the tail lamp structure 60 is referable to be such that by arranging the control element board 84 downwardly of the light-emitting diode board 82, and covering the mud guard cover 47 on the lower portion of the lens 88, the control element board 84 is masked so as not to be viewed from the outside.

With the arrangement of the control element board 84 being arranged downwardly of the light-emitting diode board 82, and covering the lower portion of the lens 88 with the mud guard cover 47, by masking the control element board 84 so as not to be viewed from the outside, the control element board 84 can be hidden from view when viewed from the outside, and can be protected from the outside.

For example, the number of components can be reduced in comparison with the case in which the control element board is masked using an additional part. Alternatively, the existing part can be used conveniently, and the application of the existing part (mud guard cover 47) can be increased.

By inclining the light-emitting diode board 82 and the control element board 84 along the inner fender 64, and arranging the same not in the same level (arranged in two steps by differentiating the depth), a vacant space can be effectively used, and accordingly, the tail lamp 46 can be formed compactly. Consequently, the layout of the tail lamp 46 is facilitated.

It is also referable to be such that the light-emitting diode board 82 is arranged not in the same level as the control element board 84, and the control element board 84 is arranged downwardly of the light-emitting diode board.

The tail lamp structure 60 is preferable to be such that the upper portion of the lens 88 (upper cover portion 111) is covered by the rear fender 43. By covering the upper portion of the lens 88 with the rear fender 43, light entering the tail lamp 46 from the outside can be blocked. Consequently, the tail lamp for a vehicle with a good visibility can be realized.

In the drawing, a mounting screw 118 is provided for tightening the inner lens (diffuser panel) 85 and the light-shielding panel 86 together. A mounting screw 119 is provided for mounting the inner fender 64 to the housing 87.

By providing the inner lens 85 between the light emitting diodes 81 . . . and the lens 88, and providing the control element board 84 rearwardly of the inner lens 85 with respect to the vehicle body, the depth of the tail lamp 46 can be reduced. In addition, the improvement of the maintenanceability of the tail lamp 46 is achieved.

Furthermore, by providing the light-shielding panel 86 between the inner lens 85 and the control element board 84, light leaking on the side of the control element board 84 can be blocked. Thus, the designing properties can be improved. Since the light-shielding panel 86 is provided integrally with the inner lens 85 (integrally mounted, or fastened with the mounting screw 118 together), the assembleability can be improved.

While the tail lamp structure for a vehicle according to the present invention is applied to the motorcycle as the vehicle as shown in FIG. 4, it is not limited thereto, and the vehicle may be a two-wheelers, three-wheelers, or four-wheelers.

While the tail lamp structure for a vehicle according to the present invention includes the license lamp 44 on the enlarged portion as shown in FIG. 2, it is not limited thereto, and the number plate mounting portion may be provided on the enlarged portion.

While the tail lamp structure for a vehicle according to the present invention includes the control element board 84 arranged downwardly of the light-emitting diode board 82 as shown in FIG. 11, it is not limited thereto, and the control element board 84 may be arranged above the light-emitting diode board.

While the tail lamp structure for a vehicle according to the present invention includes the harness 89 connected to the control element board 84 via the internal wiring member 99 as shown in FIG. 8, it is not limited thereto, and the harness may be connected to the light-emitting diode board.

The tail lamp structure for a vehicle according to the present invention is suitable for a large motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a vehicle including a rear fender for covering an upper portion of a rear wheel, a mud guard cover for covering a rear portion of the rear wheel, and a tail lamp arranged around the rear fender and the mud guard cover, comprising:

a tail lamp structure for a vehicle wherein a tail lamp having a light-emitting diode as a light source and comprises a light-emitting diode board for placing the light-emitting diode thereon, a control element board for placing a control element for controlling the light-emitting diode thereon, a housing for collectively accommodating the light-emitting diode board and the control element board, and a lens for covering the housing wherein the control element board is arranged upwardly or downwardly of the light-emitting diode board, wherein the control element board is hidden from view by arranging the control element board downwardly of the light-emitting diode board, and covering the control element board with the mud guard cover.

2. The tail lamp structure for a vehicle according to claim 1, wherein a harness is connected to the control element board or the light-emitting diode board, and the harness extends outwardly from a side of the housing.

3. The tail lamp structure for a vehicle according to claim 2, wherein the rear fender extends rearwardly above the lens with respect to an upper portion of the lens.

4. The tail lamp structure for a vehicle according to claim 1, wherein the rear fender extends rearward above the lens with respect to an upper portion of the lens.

5. The tail lamp structure for a vehicle according to claim 1, wherein the mud guard cover is formed with an enlarged portion, and the control element board is hidden from view when viewed from a rear by the enlarged portion.

6. The tail lamp structure for a vehicle according to claim 5, wherein the enlarged portion is provided with a license lamp or a number plate mounting portion.

7. The tail lamp structure for a vehicle according to claim 1, wherein an inner lens is provided between the light-emitting diode and the lens, and the control element board is provided rearwardly of the inner lens with respect to a vehicle body.

8. The tail lamp structure for a vehicle according to claim 7, wherein a light-shielding panel is provided between the inner lens and the control element board.

9. The tail lamp structure for a vehicle according to claim 8, wherein the light-shielding panel is provided integrally with the inner lens.

10. The tail lamp structure for a vehicle according to claim 7, wherein the inner lens is arranged in a position substantially parallel to the control element board.

11. In a vehicle including a rear fender for covering an upper portion of a rear wheel, a mud guard cover for covering a rear portion of the rear wheel, and a tail lamp arranged around the rear fender and the mud guard cover, comprising:
a tail lamp structure for a vehicle wherein the tail lamp includes a light-emitting diode as a light source and includes a light-emitting diode board for placing the light-emitting diode thereon, a control element board for placing a control element for controlling the light-emitting diode thereon, a housing for collectively accommodating the light-emitting diode board and the control element board, and a lens for covering the housing, wherein the control element board is offset rearwardly of the light-emitting diode board with respect to a vehicle body,
wherein an inner lens is provided between the light-emitting diode and the lens, and the control element board is provided rearwardly of the inner lens with respect to a vehicle body, and
wherein a light-shielding panel is provided between the inner lens and the control element board.

12. The tail lamp structure according to claim 11, wherein the control element board is hidden from view by arranging the control element board downwardly of the light-emitting diode board, and covering the control element board with the mud guard cover.

13. The tail lamp structure for a vehicle according to claim 11, wherein the control element board is hidden from view by arranging the control element board downwardly of the light-emitting diode board, and covering the control element board with the mud guard cover.

14. The tail lamp structure for a vehicle according to claim 13, wherein a light-shielding panel is provided between the inner lens and the control element board.

15. A tail lamp structure adapted for use around a rear fender and a mud guard cover of a vehicle, comprising:
a tail lamp having a light-emitting diode as a light source, said tail lamp including:
a light-emitting diode board for placing the light-emitting diode thereon;
a control element board for placing a control element for controlling the light-emitting diode thereon;
a housing for collectively accommodating the light-emitting diode board and the control element board; and
a lens for covering the housing;
wherein the control element board is arranged upwardly or downwardly of the light-emitting diode board,
wherein the control element board is hidden from view by arranging the control element board downwardly of the light-emitting diode board, and covering the control element board with the mud guard cover.

16. The tail lamp structure according to claim 15, wherein a harness is connected to the control element board or the light-emitting diode board, and the harness extends outwardly from a side of the housing.

17. The tail lamp structure according to claim 16, wherein the rear fender extends rearwardly above the lens with respect to an upper portion of the lens.

18. The tail lamp structure according to claim 15, wherein the rear fender extends rearward above the lens with respect to an upper portion of the lens.

19. The tail lamp structure for a vehicle according to claim 15, wherein an inner lens is provided between the light-emitting diode and the lens, and the control element board is provided rearwardly of the inner lens with respect to a vehicle body.

* * * * *